US012626513B2

(12) United States Patent
Kawai et al.

(10) Patent No.: US 12,626,513 B2
(45) Date of Patent: May 12, 2026

(54) INFORMATION PROCESSING APPARATUS, INFORMATION PROCESSING METHOD, AND NON-TRANSITORY STORAGE MEDIUM

(71) Applicant: NEC Corporation, Tokyo (JP)

(72) Inventors: Ryo Kawai, Tokyo (JP); Noboru Yoshida, Tokyo (JP); Tingting Dong, Tokyo (JP); Satoshi Yamazaki, Tokyo (JP); Jianquan Liu, Tokyo (JP); Naoki Shindou, Tokyo (JP); Karen Stephen, Tokyo (JP); Yuta Namiki, Tokyo (JP); Youhei Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 27 days.

(21) Appl. No.: 18/725,274

(22) PCT Filed: Jan. 13, 2022

(86) PCT No.: PCT/JP2022/000862
§ 371 (c)(1),
(2) Date: Jun. 28, 2024

(87) PCT Pub. No.: WO2023/135699
PCT Pub. Date: Jul. 20, 2023

(65) Prior Publication Data
US 2025/0069402 A1      Feb. 27, 2025

(51) Int. Cl.
*G06T 7/70* (2017.01)
*G06T 5/50* (2006.01)
(Continued)

(52) U.S. Cl.
CPC ................ *G06V 20/52* (2022.01); *G06T 5/50* (2013.01); *G06T 7/20* (2013.01); *G06T 7/70* (2017.01);
(Continued)

(58) Field of Classification Search
CPC .. G06V 20/53; G06T 7/70; G06T 5/50; G06T 7/20
(Continued)

(56) References Cited

U.S. PATENT DOCUMENTS

2013/0242074 A1      9/2013   Sekiguchi et al.
2013/0278420 A1*    10/2013   Araiz-Boys ............ G08B 21/10
                                                        340/539.18
(Continued)

FOREIGN PATENT DOCUMENTS

JP        2012-113368 A      6/2012
JP        2015-504616 A      2/2015
(Continued)

OTHER PUBLICATIONS

International Search Report for PCT Application No. PCT/JP2022/000862, mailed on Apr. 5, 2022.
(Continued)

*Primary Examiner* — Daquan Zhao
(74) *Attorney, Agent, or Firm* — Sughrue Mion, PLLC

(57)            ABSTRACT

An information processing apparatus (10) according to the present invention includes: an acquisition unit (11) that acquires an image captured at a site where a trouble happens; an information generation unit (12) that detects a person from the image, and also generates information relevant to the detected person, based on the image; and an output unit (13) that outputs the information relevant to the detected person.

20 Claims, 11 Drawing Sheets

(51) Int. Cl.
    *G06T 7/20*          (2017.01)
    *G06V 20/52*       (2022.01)

(52) U.S. Cl.
    CPC ............... *G06T 2207/20221* (2013.01); *G06T 2207/30201* (2013.01); *G06T 2207/30242* (2013.01); *G06V 2201/07* (2022.01)

(58) Field of Classification Search
    USPC ......................... 348/143, 142, 141, 144, 135
    See application file for complete search history.

(56) References Cited

U.S. PATENT DOCUMENTS

| | | | |
|---|---|---|---|
| 2016/0182849 A1 | 6/2016 | Wakao | |
| 2020/0116512 A1 | 4/2020 | Sugimura et al. | |
| 2020/0285249 A1* | 9/2020 | Woods ................. | G05D 1/0246 |
| 2022/0223267 A1* | 7/2022 | Naoshima ............. | G16H 10/60 |
| 2023/0063013 A1* | 3/2023 | Barash ............... | G08B 21/0211 |
| 2023/0072905 A1* | 3/2023 | Chen ....................... | H04W 4/90 |
| 2023/0162396 A1* | 5/2023 | German ................... | G01S 5/16 |
| | | | 345/633 |

FOREIGN PATENT DOCUMENTS

| | | | |
|---|---|---|---|
| JP | 2015-108923 A | 6/2015 | |
| JP | 2016-045579 A | 4/2016 | |
| JP | 2016-134765 A | 7/2016 | |
| JP | 2016-146020 A | 8/2016 | |
| JP | 2017-076304 A | 4/2017 | |
| JP | 2018-142338 A | 9/2018 | |
| JP | 2019-534488 A | 11/2019 | |
| JP | 2019-215740 A | 12/2019 | |
| JP | 2020-060959 A | 4/2020 | |
| WO | 2009/019867 A1 | 2/2009 | |
| WO | 2015/019546 A1 | 2/2015 | |
| WO | 2017/099037 A1 | 6/2017 | |
| WO | 2017/135226 A1 | 8/2017 | |
| WO | 2021/084677 A1 | 5/2021 | |

OTHER PUBLICATIONS

Zhe Cao et al., "Realtime Multi-Person 2D Pose Estimation using Part Affinity Fields", The IEEE Conference on Computer Vision and Pattern Recognition (CVPR), 2017, p. 7291-7299.
JP Office Action for JP Application No. 2023-573709, mailed on May 13, 2025 with English Translation.
JP Official Communication for JP Application No. 2023-573709, mailed on Dec. 2, 2025 with English Translation.

* cited by examiner

FIG. 2

INPUT/OUTPUT I/F — 3A

5A

PROCESSOR
1A

MEMORY
2A

PERIPHERAL CIRCUIT
4A

FIG. 3

ACQUISITION UNIT

INFORMATION GENERATION UNIT

OUTPUT UNIT

11

12

13

10

INFORMATION PROCESSING APPARATUS

FIG. 10

INFORMATION PROCESSING APPARATUS

FIG. 11

| SERIAL NUMBER | FACE INFORMATION | SAFETY CONFIRMATION | . . . . |
|---|---|---|---|
| 0013812 | * * * | COMPLETED | . . . . |
| 0008129 | * * * | UNCONFIRMED | . . . . |
| ⋮ | ⋮ | ⋮ | ⋮ |

INFORMATION PROCESSING APPARATUS, INFORMATION PROCESSING METHOD, AND NON-TRANSITORY STORAGE MEDIUM

This application is a National Stage Entry of PCT/JP2022/000862 filed on Jan. 13, 2022, the contents of all of which are incorporated herein by reference, in their entirety.

TECHNICAL FIELD

The present invention relates to an information processing apparatus, an information processing method, and a program.

BACKGROUND ART

A technique relevant to the present invention is disclosed in Patent Documents 1 and 2, and Non-Patent Document 1.

Patent Document 1 discloses a technique for assisting a fire fighting operation and the like by a fire fighter by using an eyeglasses-type wearable terminal. Specifically, it is disclosed that a layout of a structure and the like, a vital sign, and the like are displayed via the eyeglasses-type wearable terminal.

Patent Document 2 discloses a technique for computing a feature value for each of a plurality of key points of a human body included in an image, searching, based on the computed feature value, for an image including a human body of which pose is similar or a human body of which movement is similar, and classifying the pose and the movement by grouping similar poses and similar movements.

Patent Document 3 discloses a technique for assisting a rescue operation, based on positional information of a portable terminal carried by a person in need for rescue and each of a rescue member.

Patent Document 4 discloses a technique for detecting an emergency in a public facility, a building, a vehicle, and a transportation network.

Non-Patent Document 1 discloses a technique relevant to skeleton estimation of a person.

RELATED DOCUMENT

Patent Document

Patent Document 1: Japanese Patent Application Publication (Translation of PCT Application) No. 2015-504616

Patent Document 2: International Patent Publication No. WO 2021/084677

Patent Document 3: Japanese Patent Application Publication No. 2018-142338

Patent Document 4: Japanese Patent Application Publication (Translation of PCT Application) No. 2019-534488

Non-Patent Document

Non-Patent Document 1: Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, P. 7291-7299

DISCLOSURE OF THE INVENTION

Technical Problem

An example problem of the present invention is to provide a new technique for assisting a worker engaged in a rescue operation at a site where a trouble happens.

Solution to Problem

According to an example aspect of the present invention, an information processing apparatus is provided, including:
an acquisition unit that acquires an image captured at a site where a trouble happens;
an information generation unit that detects a person from the image, and also generates information relevant to the detected person, based on the image; and
an output unit that outputs the information relevant to the detected person.

Further, according to an example aspect of the present invention, an information processing method is provided, including
executing, by a computer:
an acquisition step of acquiring an image captured at a site where a trouble happens;
an information generation step of detecting a person from the image, and also generating information relevant to the detected person, based on the image; and
an output step of outputting the information relevant to the detected person.

Further, according to an example aspect of the present invention, a program is provided, causing a computer to function as:
an acquisition unit that acquires an image captured at a site where a trouble happens;
an information generation unit that detects a person from the image, and also generates information relevant to the detected person, based on the image; and
an output unit that outputs the information relevant to the detected person.

Advantageous Effects of Invention

According to an example aspect of the present invention, a technique for assisting a worker engaged in a rescue operation at a site where a trouble happens.

BRIEF DESCRIPTION OF THE DRAWINGS

The above-described object, other objects, features and advantages are further clarified by favorable example embodiments described below and the following drawings accompanying thereto.

FIG. 2 is a diagram illustrating one example of a hardware configuration of an apparatus.

FIG. 3 is a diagram illustrating one example of a functional block diagram of an information processing apparatus.

FIG. 10 is diagram illustrating one example of the functional block diagram of the information processing apparatus.

FIG. 11 is a diagram schematically illustrating one example of information to be processed by the information processing apparatus.

DESCRIPTION OF EMBODIMENTS

Hereinafter, example embodiments of the present invention is described with reference to the drawings. Note that, in all the drawings, a similar component is denoted with a similar reference sign, and description thereof is omitted as appropriate.

First Example Embodiment

"Outline"

An information processing apparatus according to the present example embodiment assists a worker engaged in a rescue operation at a site where a trouble happens (hereinafter, may simply be referred to as a "site") by using an image analysis. Specifically, after acquiring an image captured at the site where the trouble happens, the information processing apparatus detects a person from the image, and also generates information relevant to the detected person, based on the image. Then, the information processing apparatus outputs the generated information.

In the detection of a person and the generation of information relevant to the detected person, an image analysis technique is used. Examples of the image analysis technique used by the information processing apparatus include face recognition, human form recognition, pose recognition, movement recognition, appearance attribute recognition, gradient feature detection of an image, color feature detection of an image, object recognition, and the like.

"Overall View of Assistance System Including Information Processing Apparatus"

Figure 1:
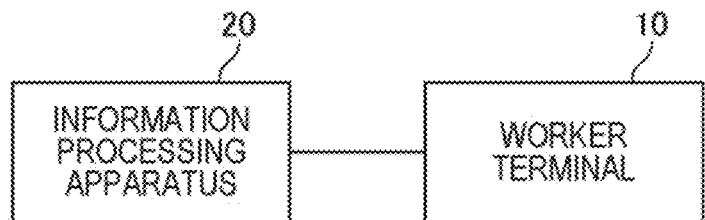
FIG. 1 is a diagram illustrating one example of a functional block diagram of an assistance system.

One example of a functional block diagram of an assistance system is illustrated in FIG. 1. As illustrated, the assistance system includes an information processing apparatus 10 and a worker terminal 20.

An outline of the information processing apparatus 10 is as described above. A detailed configuration of the information processing apparatus 10 is described later.

The worker terminal 20 is a terminal held by a worker engaged in a rescue operation at a site where a trouble happens. The worker terminal 20 includes at least an arithmetic operation function, a camera function, a communication function, an output function, and an input function.

The arithmetic operation function included in the worker terminal 20 is a function of processing input data and a program instruction.

The camera function included in the worker terminal 20 may be a function that detects visible light and converts the visible light into an image, may be a function that detects infrared light and converts the infrared light into an image, may be a camera that detects ultraviolet light and converts the ultraviolet light into an image, may be a function that detects another kind of electromagnetic wave and converts the electromagnetic wave into an image, or may be a plurality of the above-described functions. An image is a concept including at least one of a moving image and a still image.

The communication function included in the worker terminal 20 is a function of communicating with an external apparatus. The worker terminal 20 communicates with the information processing apparatus 10 by using the communication function. The communication function included in the worker terminal 20 may be a function of communicating by using a public line such as the Internet, or may be a function of communicating by using a dedicated communication line.

The output function included in the worker terminal 20 is a function of outputting information to the worker. Examples of the output function included in the worker terminal 20 include a display, a projection apparatus, a speaker, and the like, but are not limited thereto.

The input function included in the worker terminal 20 is a function of receiving an input from the worker. Examples of the input function included in the worker terminal 20 include a touch panel, a physical button, a microphone, a camera that receives a gesture input, and the like, but are not limited thereto.

Examples of the worker terminal 20 including such functions include a wearable terminal (eyeglasses-type, helmet-type, wristwatch-type, and the like), a smartphone, a cell phone, a tablet terminal, and the like, but are not limited thereto. Considering using in a rescue operation, the worker terminal 20 is preferably a wearable terminal.

The worker terminal 20 transmits an image generated by the camera function to the information processing apparatus 10, by using the communication function. The information processing apparatus 10 detects a person from the received image, and also generates information relevant to the detected person, based on the image. Then, the information processing apparatus 10 transmits the information relevant to the detected person to the worker terminal 20. The worker terminal 20 outputs the information received from the information processing apparatus 10, via the output function.

"Hardware Configuration"

Next, one example of a hardware configuration of the information processing apparatus 10 and the worker terminal 20 is described. Each function unit of the information processing apparatus 10 and the worker terminal 20 is achieved by any combination of hardware and software, mainly including a central processing unit (CPU) of any computer, a memory, a program loaded onto the memory, a storage unit (that can store a program downloaded from a storage medium such as a compact disc (CD), a server on the Internet, or the like, in addition to a program preliminarily stored since a stage of shipping an apparatus) storing the program, such as a hard disk, and an interface for network connection. Further, it is understood by a person skilled in the art that there are various modification examples of a method and an apparatus for achieving the information processing apparatus 10 and the worker terminal 20.

Figure 2:
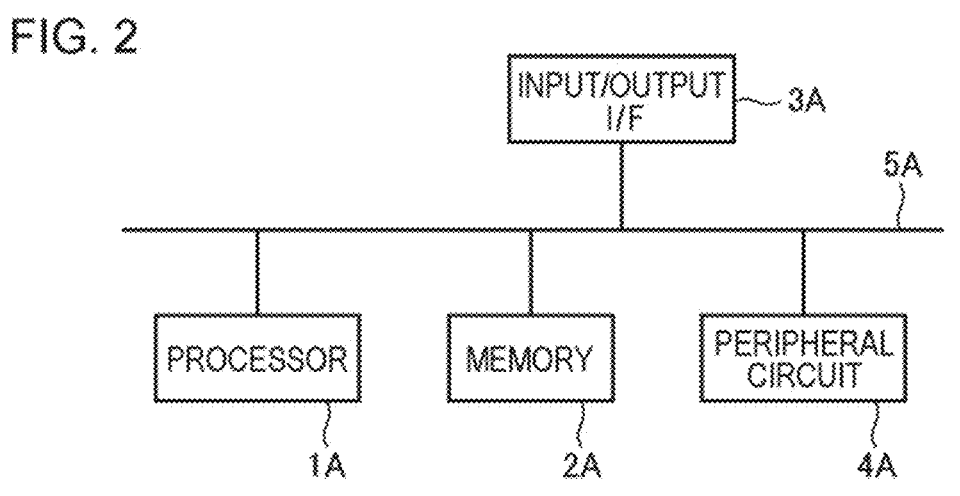

FIG. 2 is a block diagram illustrating the hardware configuration of the information processing apparatus 10 and worker terminal 20. As illustrated in FIG. 2, each of the information processing apparatus 10 and the worker terminal 20 includes a processor 1A, a memory 2A, an input/output interface 3A, a peripheral circuit 4A, and a bus 5A. The peripheral circuit 4A includes various modules. Each of the information processing apparatus 10 and the worker terminal 20 may not include the peripheral circuit 4A. Note that, each of the information processing apparatus 10 and the worker terminal 20 may be configured of a plurality of apparatuses that are physically and/or logically separated. In this case, each of the plurality of apparatuses can include the above-described hardware configuration.

The bus 5A is a data transmission path for the processor 1A, the memory 2A, the peripheral circuit 4A, and the input/output interface 3A to mutually transmit and receive data. The processor 1A is, for example, an arithmetic processing apparatus such as a CPU and a graphics processing unit (GPU). The memory 2A is a memory, for example, such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can issue an instruction to each module, and perform arithmetic operation, based on a result of arithmetic operation by each module.

"Functional Configuration"

Figure 3:
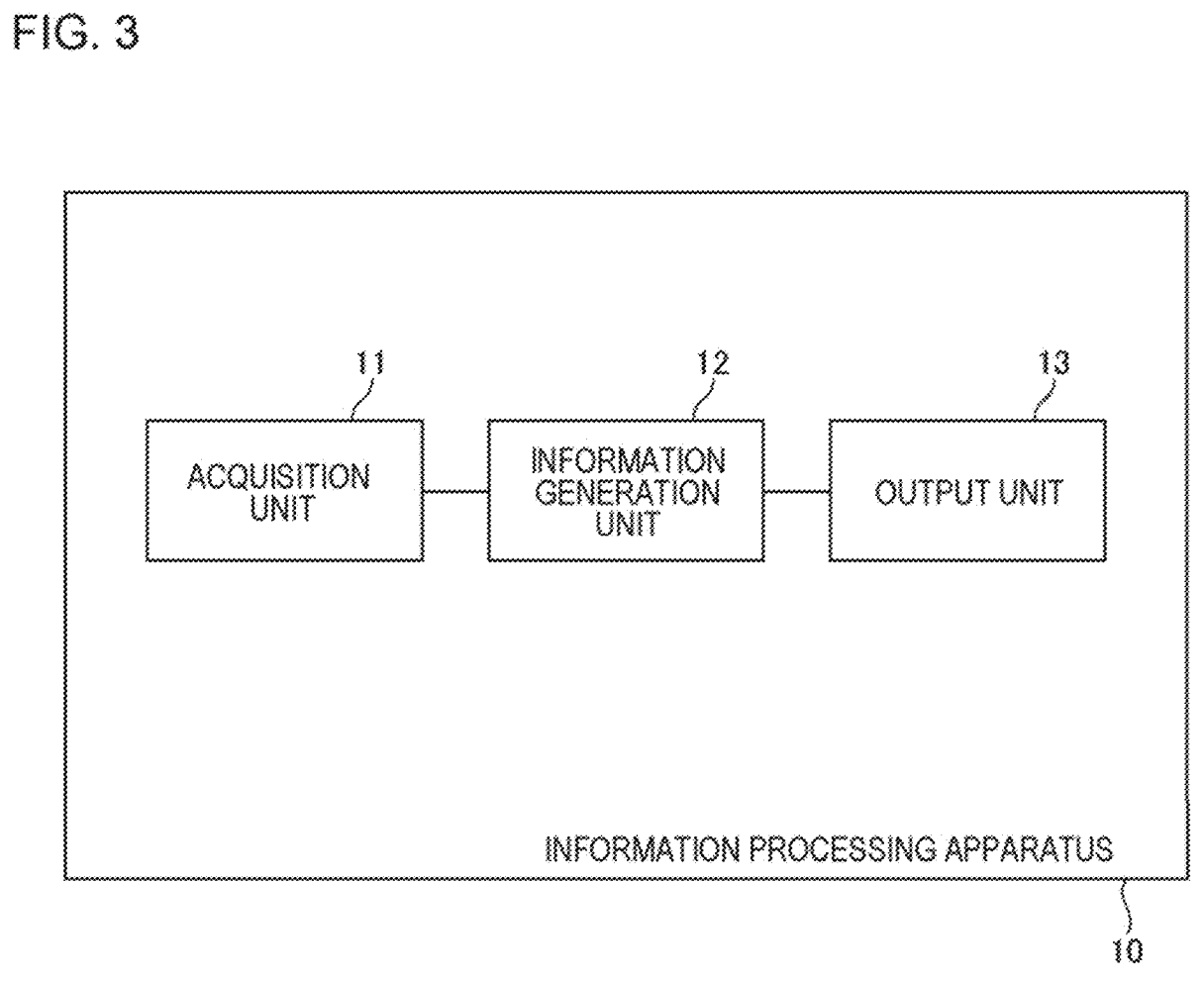

Next, a functional configuration of the information processing apparatus 10 according to the present example embodiment is described in detail. One example of a functional block diagram of the information processing apparatus 10 according to the present example embodiment is illustrated in FIG. 3. As illustrated, the information processing apparatus 10 includes an acquisition unit 11, an information generation unit 12, and an output unit 13.

The acquisition unit 11 acquires an image captured at a site where a trouble happens. Specifically, the acquisition unit 11 acquires an image generated by the worker terminal 20. The acquisition unit 11 acquires the image generated by the worker terminal 20, in real time.

The information generation unit 12 detects a person from the image acquired by the acquisition unit 11, and also generates information relevant to the detected person, based on the image.

Figure 4:
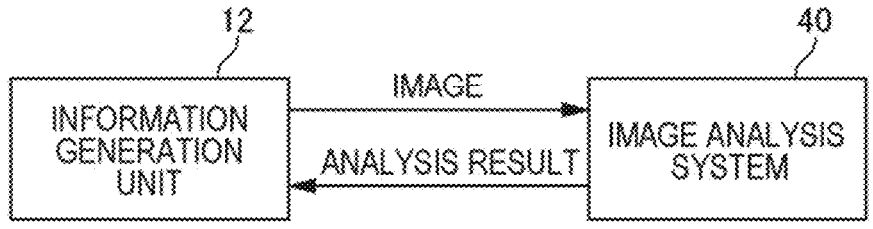
FIG. 4 is a diagram for describing processing by an information generation unit.

In the present example embodiment, as illustrated in FIG. 4, an image analysis system 40 that analyzes an image and outputs a result of the analysis is prepared. The image analysis system 40 may be a part of the information processing apparatus 10, or may be an external apparatus being physically and/or logically separated from the information processing apparatus 10. Further, the image analysis system 40 may be a part of the assistance system according to the present example embodiment, or may be an external apparatus being physically and/or logically separated from the assistance system. The information generation unit 12 achieves the detection of a person and the generation of information relevant to the detected person described above, by using the image analysis system 40.

Herein, the image analysis system 40 is described. The image analysis system 40 include at least one of a face recognition function, a human form recognition function, a pose recognition function, a movement recognition function, an appearance attribute recognition function, a gradient feature detection function of an image, a color feature detection function of an image, and an object recognition function.

The face recognition function extracts a feature value of a person, and also determines a position of a face of the person in an image. Further, a similarity between the face feature values may be collated and computed (determination as to whether it is the same person, and the like). The human form recognition function extracts a human body feature value of a person (for example, overall characteristics such as a body shape i.e., obese or thin, a body height, clothing, and the like), and also determines a position of the person in an image. Further, a similarity between the human body feature values may be collated and computed (determination as to whether it is the same person, and the like).

The pose recognition function and the movement recognition function detect a joint point of a person, and configure a stick human model by connecting the joint points. Further, by using information of the stick human model, a body height of the person is estimated, a feature value of a pose is extracted, a movement is determined based on a change in pose, and a position of the person in an image is determined. Further, a similarity between the pose feature values, and a similarity between the movement feature values may be collated and computed (determination as to whether it is the same pose and the same movement, and the like). The pose recognition function and the movement recognition function may be achieved by using the above-described techniques disclosed in Patent Document 2 and Non-Patent Document 1.

The appearance attribute recognition function recognizes an appearance attribute associated with a person (for example, there are 100 or more types of attribute, such as a clothing color, a shoe color, a hair style, wearing a hat, a necktie, and the like). Further, a similarity between the recognized appearance attributes may be collated and computed (determination as to whether it is the same attribute is possible).

The gradient feature detection function of an image is SIFT, SURF, RIFF, ORB, BRISK, CARD, HOG, and the like. The color feature detection function of an image generates data indicating a feature of color of an image, such as a color histogram. The object recognition function is achieved by using an engine such as YOLO (capable of extracting a general object [for example, a car, a bicycle, a chair, and the like], and extracting a person). By using the object recognition function, an object can be detected from an image, and a position of the object in the image can be determined.

As illustrated in FIG. 4, the information generation unit 12 inputs an image to the image analysis system 40. Further, the information generation unit 12 acquires a result of an image analysis output from the image analysis system 40.

The image analysis result output from the above-described image analysis system 40 includes a result of detecting a person from an image (for example, a result of analysis by the face recognition function, a result of analysis by the human form recognition function, a result of analysis by the pose recognition function, a result of analysis by the movement recognition function, and a result of analysis by the object recognition function).

Further, the information generation unit 12 can set, as information relevant to a detected person, an analysis result output from the above-described image analysis system 40, for example, a result of analysis by the face recognition function, a result of analysis by the human form recognition function, a result of analysis by the pose recognition function, a result of analysis by the movement recognition function, a result of analysis by the appearance attribute recognition function, a result of analysis by the gradient feature detection function of an image, a result of analysis by the color feature detection function of an image, a result of analysis by the object recognition function, and the like. Further, the information generation unit 12 can set, as information related to the detected person, information acquired by performing statistically processing, editing processing, modifying processing, and the like on the analysis result output from the above-described image analysis system 40. A specific example of information generated by the information generation unit 12 is described in an example embodiment described below.

The output unit 13 outputs information generated by the information generation unit 12. For example, the output unit 13 outputs information relevant to a person detected from an image. The information output from the output unit 13 is transmitted to the worker terminal 20. Then, the worker terminal 20 outputs the information via an output apparatus such as a display.

Figure 5:
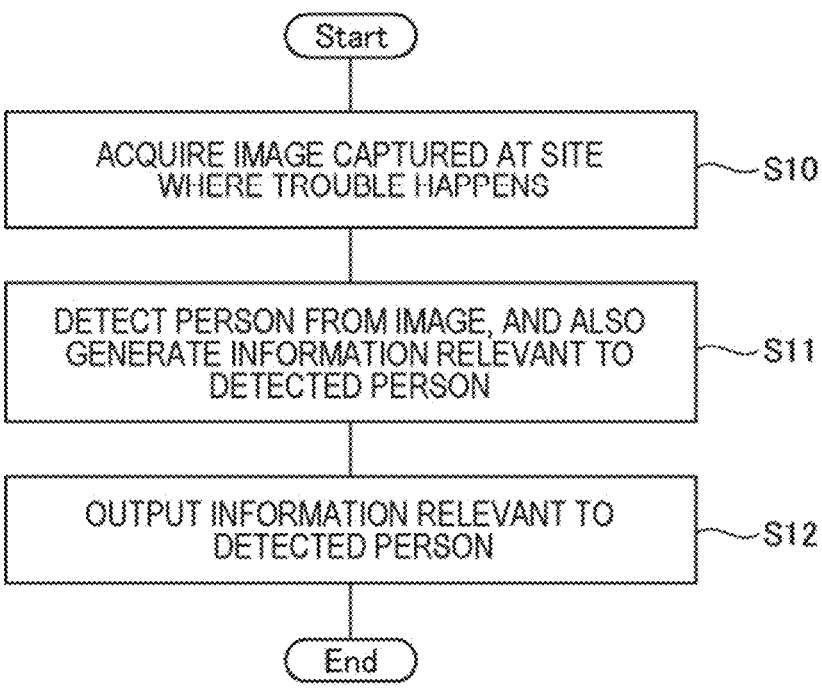
FIG. 5 is a flowchart illustrating one example of a flow of processing by the information processing apparatus.

Next, one example of a flow of processing by the information processing apparatus 10 is described with reference to a flowchart in FIG. 5.

First, the information processing apparatus 10 acquires an image captured at a site where a trouble happens (S10). In the present example embodiment, the information processing apparatus 10 acquires an image generated by the worker terminal 20.

Next, the information processing apparatus 10 detects a person from the acquired image, and also generates information relevant to the detected person, based on the image (S11). The processing in S11 is achieved by using the image analysis system 40.

Then, the information processing apparatus 10 outputs the information generated in S11, for example, the information relevant to the detected person (S12). In the present example embodiment, the information processing apparatus 10 transmits the information generated in S11 to the worker terminal 20.

Advantageous Effect

After acquiring an image captured at a site where a trouble happens, the information processing apparatus 10 according to the present example embodiment can detect a person from the image, also generate information relevant to the person, based on the image, and output the generated information. By the information processing apparatus 10 in this manner, a worker engaged in a rescue operation at a site where a trouble happens can be assisted by using an image analysis technique.

Second Example Embodiment

"Overall View of Assistance System Including Information Processing Apparatus"

Figure 6:
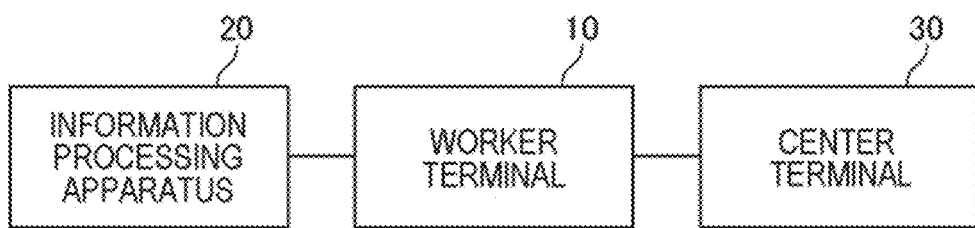
FIG. 6 is a diagram illustrating another example of the functional block diagram of the assistance system.

One example of a functional block diagram of an assistance system according to the present example embodiment is illustrated in FIG. 6. As illustrated, the assistance system according to the present example embodiment includes an information processing apparatus 10, a worker terminal 20, and a center terminal 30.

A configuration of the information processing apparatus 10 and the worker terminal 20 is similar to that of the first example embodiment.

The center terminal 30 is a terminal used in a center that manages a rescue operation carried out at a site where a trouble happens. For example, the center terminal 30 is used by a commander, a supervisor, or the like of a rescue operation. The center terminal 30 includes at least an arithmetic operation function, a communication function, an output function, and an input function.

The arithmetic operation function included in the center terminal 30 is a function of processing input data and a program instruction.

The communication function included in the center terminal 30 is a function of communicating with an external apparatus. The center terminal 30 communicates with the information processing apparatus 10 by using the communication function. The communication function included in the center terminal 30 may be a function of communicating by using a public line such as the Internet, or may be a function of communicating by using a dedicated communication line.

The output function included in the center terminal 30 is a function of outputting information to a user. Examples of the output function included in the center terminal 30 include a display, a projection apparatus, a speaker, and the like, but are not limited thereto.

The input function included in the center terminal 30 is a function of receiving an input from a user. Examples of the input function included in the center terminal 30 include a touch panel, a physical button, a microphone, a camera that receives a gesture input, and the like, but are not limited thereto.

Examples of the center terminal 30 including such functions include a tablet terminal, a personal computer, a computer dedicated for the purpose, a smartphone, a cell phone, a wearable terminal, and the like, but are not limited thereto.

The worker terminal 20 transmits an image generated by a camera function to the information processing apparatus 10, by using the communication function. Further, the center terminal 30 may acquire, by any means, an image generated by a camera installed at a site where a trouble happens, and sensor data generated by another sensor (a temperature sensor, a smoke sensor, and the like), and transmit the acquired image and data to the information processing apparatus 10. The information processing apparatus 10 detects a person from the received image, and also generates information relevant to the detected person, based on the image. Further, the information processing apparatus 10 generates various kinds of information, based on the received sensor data. Then, the information processing apparatus 10 transmits the information relevant to the detected person and the information generated based on the sensor data to at least one of the worker terminal 20 and the center terminal 30. The at least one of the worker terminal 20 and the center terminal 30 outputs the information received from the information processing apparatus 10, via the output function.

"Hardware Configuration"

One example of a hardware configuration of the information processing apparatus 10 and the worker terminal 20 is similar to that of the first example embodiment. Each functional unit of the center terminal 30 is achieved by any combination of hardware and software, mainly including a CPU and of any computer, a memory, a program loaded onto the memory, a storage unit (that can store a program downloaded from a storage medium such as a CD, a server on the Internet, or the like, in addition to a program preliminarily stored since a stage of shipping an apparatus) storing the program, such as a hard disk, and an interface for network connection. Further, it is understood by a person skilled in the art that there are various modification examples of a method and an apparatus for achieving the center terminal 30.

FIG. 2 is a block diagram illustrating a hardware configuration of the center terminal 30. As illustrated in FIG. 2, the center terminal 30 includes a processor 1A, a memory 2A, an input/output interface 3A, a peripheral circuit 4A, and a bus 5A. The peripheral circuit 4A includes various modules. The center terminal 30 may not include the peripheral circuit 4A. Note that, the center terminal 30 may be configured of a plurality of apparatuses that are physically and/or logically separated. In this case, each of the plurality of apparatuses can include the above-described hardware configuration.

"Functional Configuration"

Next, a functional configuration of the information processing apparatus 10 is described. One example of a functional block diagram of the information processing apparatus 10 according to the present example embodiment is illustrated in FIG. 3.

An acquisition unit 11 acquires an image captured at a site where a trouble happens. Specifically, the acquisition unit 11 acquires an image generated by the worker terminal 20. The acquisition unit 11 acquires the image generated by the worker terminal 20, in real time. Further, the acquisition unit 11 may acquire an image generated by a camera installed at the site where the trouble happens, and sensor data generated by another sensor (a temperature sensor, a smoke sensor, and the like). For example, in a case where a server that collects in real time and accumulates the image generated by the camera installed at a site where the trouble happens and the sensor data generated by the another sensor (a temperature sensor, a smoke sensor, and the like) is provided in advance, the acquisition unit 11 may acquire those pieces of data from the server by any means. As one example, a worker works at a center that manages a rescue operation carried out at the site where the trouble happens may operate center terminal 30, access the server, and acquire those pieces of data. Further, the acquired data may be transmitted from the center terminal 30 to the information processing apparatus 10. Note that, the means of acquisition is merely one example, and a means for acquiring the image generated by the camera installed at the site where the trouble happens and sensor data generated by the another sensor (a temperature sensor, a smoke sensor, and the like) is not limited thereto.

An information generation unit 12 inputs at least one of an image generated by the worker terminal 20 and an image generated by a camera installed at a site where a trouble happens to an image analysis system 40, and acquires an analysis result output from the image analysis system 40 (for example, a result of analysis by a face recognition function, a result of analysis by human form recognition function, a result of analysis by a pose recognition function, a result of analysis by a movement recognition function, a result of analysis by an appearance attribute recognition function, a result of analysis by a gradient feature detection function of an image, a result of analysis by a color feature detection function of an image, and a result of analysis by an object recognition function). Further, the information generation unit 12 can generate information acquired by performing statistically processing, editing processing, modifying processing and the like on the analysis result output from the above-described image analysis system 40. Further, the information generation unit 12 can generate information acquired by performing statistically processing, editing processing, modifying processing, and the like on sensor data generated by a sensor (a temperature sensor, a smoke sensor, and the like) installed at the site where the trouble happens.

Next, one example of a flow of processing by the information processing apparatus 10 is described with reference to a flowchart in FIG. 5.

First, the information processing apparatus 10 acquires an image captured at a site where a trouble happens (S10). In the present example embodiment, the information processing apparatus 10 acquires an image generated by the worker terminal 20. Further, the information processing apparatus 10 may acquire an image generated by a camera installed at the site where the trouble happens, and sensor data generated by another sensor (a temperature sensor, a smoke sensor, and the like).

Next, the information processing apparatus 10 detects a person from the acquired image, and also generates information relevant to the detected person, based on the image (S11). The processing in S11 is achieved by using the image analysis system 40. Further, the information processing apparatus 10 can generate information acquired by performing statistically processing, editing processing, modifying processing, and the like on the sensor data generated by the sensor (a temperature sensor, a smoke sensor, and the like) installed at the site where the trouble happens.

Then, the information processing apparatus 10 outputs the information generated in S11, for example, the information relevant to the detected person (S12). In the present example embodiment, the information processing apparatus 10 transmits the information generated in S11 to at least one of the worker terminal 20 and the center terminal 30.

Other configurations of the information processing apparatus 10 according to the present example embodiment are similar to those of the first example embodiment.

Advantageous Effect

According to the information processing apparatus 10 of the present example embodiment, an advantageous effect similar to that of the first example embodiment is achieved. Further, by the information processing apparatus 10 according to the present example embodiment, a worker engaged in a rescue operation at a site where a trouble happens can be assisted, further using an image generated by a camera installed at the site where the trouble happens and sensor data generated by another sensor (a temperature sensor, a smoke sensor, and the like).

Third Example Embodiment

In the present example embodiment, information relevant to a detected person generated by an information generation unit 12 is specifically described. In the present example embodiment, information relevant to a detected person includes positional information of the detected person. In other words, in the present example embodiment, a person present at a site where a trouble happens is detected by an image analysis, and positional information indicating a position of the detected person is output.

The information generation unit 12 generates, for example, positional information indicating a position in an image of a person detected in the image. Then, an output unit 13 outputs the positional information. For example, the output unit 13 may output the information indicating the position in an image of the person detected in the image, by using an augmented reality (AR) technique.

Alternatively, the information generation unit 12 may generate positional information indicating a position in a real world of a person detected in an image. For example, the information generation unit 12 determines, as the positional information, an object in a periphery of the detected person. The determination is achieved, for example, by an object recognition function of an image analysis system 40. Then, the output unit 13 outputs information indicating the determined object. For example, the output unit 13 may output information such as "there is a person in a periphery of a blackboard". In this case, the "blackboard" is the "determined object".

Note that, in a case where a map (a floor map and the like) of a site where a trouble happens is generated in advance, an information processing apparatus 10 may acquire data of the map by any means such as a user input. The map indicates a position of an object such as a blackboard, a door, a window, and the like in the site. Further, by using the map, the information generation unit 12 may determine a relative relationship (a direction, a distance, and the like) between a current position of a worker and a position of a determined object. Further, the output unit 13 may output information indicating the determined relationship. The current position of the worker may be determined, for example, by a global positioning system (GPS) and the like provided in a worker terminal 20, or may be determined by detecting the worker from an image generated by a camera installed at the site. The above-described information indicating the relative relationship is, for example, "there is a person in a periphery of a blackboard approximately three meters away in a north direction", and the like. Alternatively, the above-described relative relationship may be, for example, "there is a person in a periphery of a blackboard approximately 10 meters away in a front-left, 10 o'clock direction", and the like. In a case of this example, the information generation unit 12 needs to determine an orientation (an orientation of sight, an orientation of face, or an orientation of body) of a worker at that time. There are various means for achieving this, and examples thereof include "attaching a magnetic sensor to a wearable terminal (the worker terminal 20) and using data from the magnetic sensor", "after a worker is detected from an image captured by a camera installed at the site, computing based on an installation position of the camera, an orientation of the camera, and a state of a worker (which one of eyes or ears is visible in an image, a direction of sight, a direction of face, a direction of body, and the like) in the image", "comparing a video from a wearable camera and a video from a camera installed at the site", and the like.

Other configurations of the information processing apparatus 10 according to the present example embodiment is similar to those of the first and second example embodiments.

According to the information processing apparatus 10 of the present example embodiment, an advantageous effect similar to that of the first and second example embodiments is achieved. Further, according to the information processing apparatus 10 of the present example embodiment, a person present at a site where a trouble happens is detected by an image analysis, and positional information indicating a position of the detected person is output. As a result, work of searching for a rescue target at the site can be assisted. Further, an inconvenience such as overlooking a rescue target can be prevented.

Fourth Example Embodiment

In the present example embodiment, information relevant to a detected person generated by an information generation unit 12 is specifically described. In the present example embodiment, information relevant to a detected person indicates at least one of the number of persons in each of a plurality of poses, the number of persons doing each of a plurality of movements, the number of persons in each age group, and the number of persons of each gender.

"The Number of Persons in Each of a Plurality of Poses"

The plurality of poses are "lying", "sitting", "standing", "crouching", and the like, but are not limited thereto. A pose of each detected persons can be recognized by a pose recognition function of an image analysis system 40. Further, the information generation unit 12 can compute the number of persons in each of the poses, by aggregating results of the recognition. An output unit 13 outputs the number of persons in each of the plurality of poses. For example, the output unit 13 may output information such as "person lying: three, person sitting: five, person crouching: one". A worker can quickly recognize a situation at a site, based on the information.

"Number of Persons Doing Each of a Plurality of Movements"

The plurality of movements are "moving in a standing state", "moving in a sitting state", "crawling forward", "not moving", but are not limited thereto. A movement of each detected person can be recognized by a movement recognition function of the image analysis system 40. Further, the information generation unit 12 can compute the number of persons doing each of the movements, by aggregating results of the recognition. The output unit 13 outputs the number of persons doing each of the plurality of movements. For example, the output unit 13 may output information such as "person moving in a standing state: two, person moving in a sitting state: five, person crawling forward: four, person not moving: two". A worker can quickly recognize a situation at a site, based on the information.

"Number of Persons in Each Age Group"

The image analysis system 40 may further include a function that estimates an age group of a detected person. The image analysis system 40 can achieve the function by employing any well-known technique. Further, the information generation unit 12 can compute the number of persons in each age group, by aggregating results of the estimation. The output unit 13 outputs the number of persons in each age group. For example, the output unit 13 may output information such as "nine years old or younger: zero, 10 to 19 years old: two, 20 to 49 years old: seven, 50 to 69 years old: five, 70 years old or older: three". A worker can quickly recognize a situation at a site, based on the information.

"Number of Persons of Each Gender"

The image analysis system 40 may further include a function that estimates gender of a detected person. The image analysis system 40 can achieve the function by employing any well-known technique. Further, the information generation unit 12 can compute the number of persons of each gender, by aggregating results of the estimation. The output unit 13 outputs the number of persons of each gender. For example, the output unit 13 may output information such as "male: five, female: two". A worker can quickly recognize a situation at a site, based on the information.

Other configurations of an information processing apparatus 10 according to the present example embodiment are similar to those of the first to third example embodiments.

According to the information processing apparatus 10 of the present example embodiment, an advantageous effect similar to that of the first to third example embodiments is achieved. Further, according to the information processing apparatus 10 of the present example embodiment, a person present at a site where a trouble happens is detected by an image analysis, and information indicating at least one of the number of persons in each of a plurality of poses, the number of persons doing each of a plurality of movements, the number of persons in each age group, and the number of persons of each gender is output. As a result, work of recognizing a situation at the site can be assisted.

Fifth Example Embodiment

In the present example embodiment, information relevant to a detected person generated by an information generation unit 12 is specifically described. In the present example embodiment, information relevant to a detected person indicates at least one of a number and positional information of persons who satisfy a condition defined by using at least one of a pose, a movement, an age group, and gender.

The condition is defined, for example, in such a way to be satisfied by a person with high urgency of rescue, a person with high priority of rescue, and the like. Examples of the condition include "(pose) lying or crouching", "(age group) nine years old or younger, or 70 years old or older, and (movement) not moving", and the like, but are not limited thereto.

The information generation unit 12 can acquire positional information of a person who satisfies the condition, based on a result output from an image analysis system 40. Further, by aggregating results output from the image analysis system 40, the information generation unit 12 can determine the number of persons who satisfy the condition. An output unit 13 outputs information indicating at least one of the number and the positional information of the persons who satisfy the condition. For example, the output unit 13 may output information such as "there are three persons who satisfy the condition", and the like. A method of outputting the positional information is as described above. A worker can quickly recognize a situation at a site, for example, the number and positions of persons with high urgency of rescue and persons with high priority of rescue, based on the information.

Other configurations of an information processing apparatus 10 according to the present example embodiment are similar to those of the first to fourth example embodiments.

According to the information processing apparatus 10 of the present example embodiment, an advantageous effect similar to that of the first to fourth example embodiments is achieved. Further, according to the information processing apparatus 10 of the present example embodiment, a person present at a site where a trouble happens is detected by an image analysis, and at least one of the number and positional information of persons who satisfy a condition defined by using at least one of a pose, a movement, an age group, and gender is output. As a result, work of recognizing a situation at the site can be assisted.

Sixth Example Embodiment

In the present example embodiment, information relevant to a person detected by an information generation unit 12 is specifically described. In the present example embodiment, information relevant to a detected person indicates a priority of rescue for each detected person, the priority being determined by at least one of a pose, a movement, an age group, and gender.

In a case where a plurality of persons are detected from an image, the information generation unit 12 determines priority of rescue for the priority of detected persons, based on at least one of a pose, a movement, an age group, and gender. A pose, a movement, an age group, gender, and the like of each of the detected persons are indicated by a result of an image analysis output from an image analysis system 40. The information generation unit 12 determines, based on a priority determination rule being preliminarily registered in an information processing apparatus 10, priority of rescue for each of the plurality of persons detected from an image.

Although a content of the priority determination rule is not particularly limited, for example, a condition for giving a point, such as "(gender) female: three points, male: one point", "(age group) nine years old or younger: five points, 10 to 19 years old: 4.5 points, . . . ", and "(pose) lying: eight points, crouching: seven points, . . . ", may be set. In this case, the information generation unit 12 detects a condition satisfied for each person, and computes a total point by adding up points for the detected condition. Then, the information generation unit 12 determines the priority in order of the total points. Note that, the example herein is merely one example, and is not limited thereto.

An output unit 13 outputs priority of each of the plurality of detected persons. For example, the output unit 13 may output information indicating the priority in association with each of the plurality of persons detected in an image, by using an AR technique. A worker can quickly recognize a situation at a site and the priority of rescue for the plurality of persons, based on the information.

Other configurations of the information processing apparatus 10 according to the present example embodiment are similar to those of the first to fifth example embodiments.

According to the information processing apparatus 10 of the present example embodiment, an advantageous effect similar to that of the first to fifth example embodiments is achieved. Further, according to the information processing apparatus 10 of the present example embodiment, a person present at a site where a trouble happens is detected by an image analysis, and priority of rescue determined by using at least one of a pose, a movement, an age group, and gender is output. As a result, work of recognizing a situation at the site can be assisted.

Seventh Example Embodiment

In the present example embodiment, an information generation unit 12 generates information relevant to an environment at a site. Then, an output unit 13 outputs the generated information relevant to the environment at the site.

The information relevant to the environment at the site indicates at least one of a current temperature of the site, a trend of temporal change in temperature of the site, a current smoke state of the site, a trend of temporal change in smoke of the site, a current state of a plurality of pieces of equipment installed at the site, and a trend of temporal change in state of the plurality of pieces of equipment installed at the site.

"Current Temperature of Site"

The information generation unit 12 can recognize a temperature of the site, based on sensor data generated by a temperature sensor installed at the site. Alternatively, the information generation unit 12 may recognize a temperature of the site, based on a thermography generated by a worker terminal 20. The output unit 13 outputs information indicating a current temperature of the site.

"Trend of Temporal Change in Temperature of Site"

The information generation unit 12 can recognize a trend of temporal change in temperature of the site, based on sensor data generated by a temperature sensor installed at the site. The trend is categorized, for example, as "temperature rising", "temperature falling", "temperature unchanged", or the like. Although there are various methods of categorization, for example, a temperature $T_0$ of a predetermined time earlier and a current temperature $T_1$ may be compared, and in a case where a difference between $T_0$ and $T_1$ is less than a reference value, the trend may be categorized as "temperature unchanged", in a case where the difference between $T_0$ and $T_1$ is equal to or more than the reference value and $T_0$ is greater than $T_1$, the trend may be categorized as "temperature falling", and in a case where the difference between $T_0$ and $T_1$ is equal to or more than the reference value and $T_1$ is greater than $T_0$, the trend may be categorized as "temperature rising".

Further, "temperature falling" may be further subdivided into "slowly falling", "rapidly falling", and the like, based on a magnitude of the difference between $T_0$ and $T_1$. The same is also applicable to "temperature raising".

"Current Smoke State of Site"

The information generation unit 12 can recognize a smoke state of the site, based on sensor data generated by a smoke sensor installed at the site. The output unit 13 outputs information indicating a current smoke state of the site. The smoke state may be indicated in terms of smoke density.

"Trend of Temporal Change in Smoke State of Site"

The information generation unit 12 can recognize a trend in temporal change in smoke state of the site, based on sensor data generated by the smoke sensor installed at the site. The trend is categorized, for example, as "smoke density increasing", "smoke density decreasing", "smoke density unchanged", or the like. Although there are various methods of categorization, for example, a smoke density $D_0$ of a predetermined time earlier and a current smoke density $D_1$ may be compared, and in a case where a difference between $D_0$ and $D_1$ is less than a reference value, the trend may be categorized as "smoke density unchanged", in a case where the difference between $D_0$ and $D_1$ is equal to or more than the reference value and $D_0$ is greater than $D_1$, the trend may be categorized as "smoke density decreasing", and in a case where the difference between $D_0$ and $D_1$ is equal to or more than the reference value and $D_1$ is greater than $D_0$, the trend may be categorized as "smoke density increasing".

Further, "smoke density decreasing" maybe further subdivided into "slowly decreasing", "rapidly decreasing", and the like, based on a magnitude of the difference between $D_0$ and $D_1$. The same is also applicable to "smoke density increasing".

"Current State of Plurality of Pieces of Equipment Installed at Site"

The information generation unit 12 recognizes a current state of a camera installed at the site where a trouble happens, and other sensors (the temperature sensor, the smoke sensor, and the like), specifically, whether to be failed after the trouble happens at the site. There are various methods of achieving the recognition. For example, in a case in which it is configured in such a way as to transmit, in a case where a function of the camera or the sensor other than a communication function fails, failure information indicating the failure to a predetermined server from the camera or the sensor, the information generation unit 12 may recognize whether the camera or the sensor fails, based on reception status of the failure information. The reception status of the failure information stored in the above-described predetermined server is input to the information processing apparatus 10 by any means. Further, in a case where the server is unable to communicate with the camera or the sensor, the information generation unit 12 may determine that the camera or the sensor fails. A fact that the server is unable to communicate with the camera or the sensor is input to the information processing apparatus 10 by any means.

"Trend of Temporal Change in State of Plurality of Pieces of Equipment Installed at Site"

A trend of temporal change in state of the plurality of pieces of equipment installed at the site is categorized as, for example, "no equipment failure occurs", "the number of pieces of failed equipment unchanged", "the number of pieces of failed equipment slowly increasing", "the number of pieces of failed equipment rapidly increasing", or the like. Although there are various methods of categorization, for example, the number of pieces of failed equipment of a predetermined time earlier $B_0$ and a current number of pieces of failed equipment $B_1$ may be compared, and in a case where a difference between $B_0$ and $B_1$ is "zero" and both $B_0$ and $B_1$ are "zero", the trend may be categorized as "no equipment failure occurs", in a case where the difference between $B_0$ and $B_1$ is "zero" and both $B_0$ and $B_1$ are one or more, the trend may be categorized as "the number of pieces of failed equipment unchanged", in a case where the difference between $B_0$ and $B_1$ is more than zero and equal to or less than a first reference value, the trend may be categorized as "the number of pieces of failed equipment slowly increasing", and in a case where the difference between $B_0$ and $B_1$ is more than the first reference value, the trend may be categorized as "the number of pieces of failed equipment rapidly increasing".

Other configurations of the information processing apparatus 10 according to the present example embodiment are similar to those of the first to sixth example embodiments.

According to the information processing apparatus 10 of the present example embodiment, an advantageous effect similar to that of the first to sixth example embodiments is achieved. Further, according to the information processing apparatus 10 of the present example embodiment, at least one of a current temperature of a site where a trouble happens, a trend of temporal change in temperature of the site, a current smoke state of the site, a trend of temporal change in smoke of the site, a current state of a plurality of pieces of equipment installed at the site, and a trend of temporal change in state of the plurality of pieces of equipment installed at the site is output. As a result, a worker and the like can quickly recognize an environment of the site.

Eighth Example Embodiment

In the present example embodiment, an information generation unit 12 generates information relevant to a local environment of a site. An environment of a site may vary locally. Thus, the information generation unit 12 generates information relevant to a local environment of the site.

The information generation unit 12 handles an environment of a site determined based on each of a plurality of cameras and sensors as information indicating an environment of only a predetermined area (e.g., an area within a predetermined distance from a reference point) determined based on an installation position of each of the cameras and sensors as the reference point. The environment of the site is determined by using the method described in the seventh example embodiment. Then, an output unit 13 outputs the information relevant to the local environment of the site generated in this way.

Figure 7:
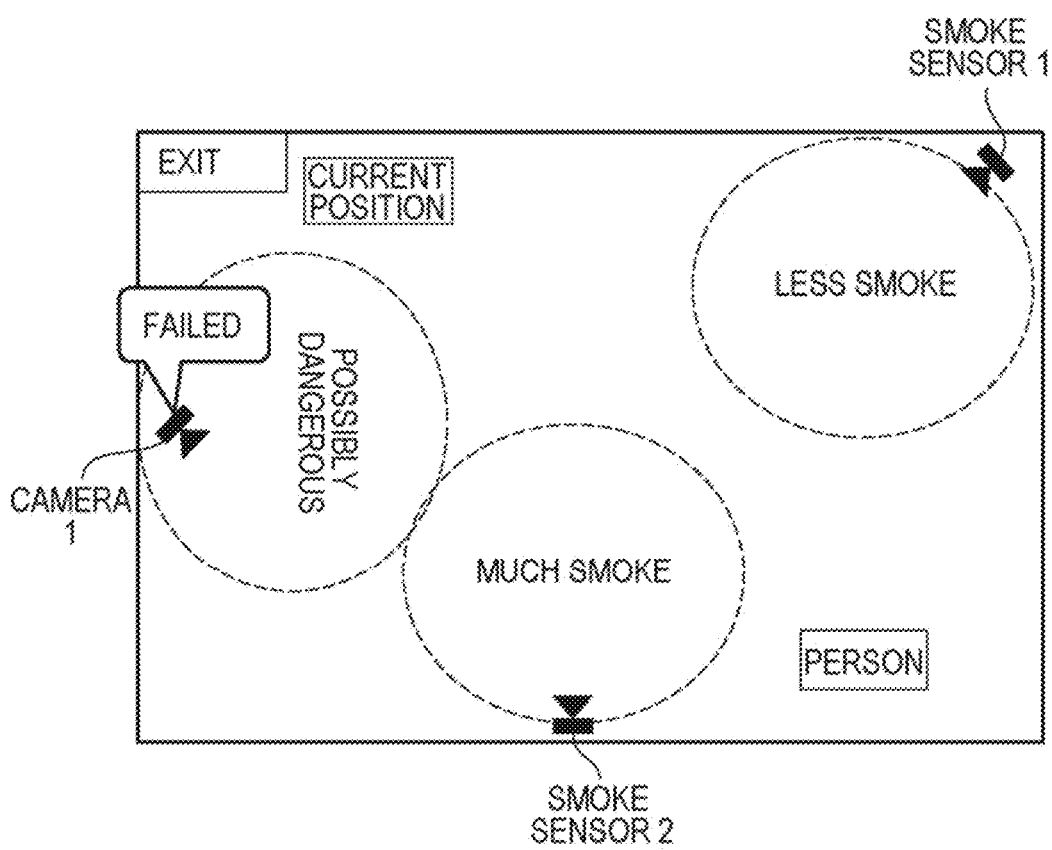
FIG. 7 is a diagram schematically illustrating one example of information output from the information processing apparatus.

One example of information output by the output unit 13 is schematically illustrated in FIG. 7. FIG. 7 is an image in which information relevant to a local environment of a site is mapped on a map of the site where a trouble happens.

In FIG. 7, since a current smoke density determined based on sensing data from a smoke sensor 1 is equal to or less than a reference value, information "less smoke" is displayed in association with a peripheral area of the smoke sensor 1.

Further, in FIG. 7, since a current smoke density determined based on sensing data from a smoke sensor 2 is greater than the reference value, information "much smoke" is displayed in association with a peripheral area of the smoke sensor 2.

Further, in FIG. 7, since a camera 1 fails after a trouble happened at the site, information "possibly dangerous" is displayed in association with a peripheral area of the camera 1.

Other configurations of an information processing apparatus 10 according to the present example embodiment are similar to those of the first to seventh example embodiments.

According to the information processing apparatus 10 of the present example embodiment, an advantageous effect similar to that of the first to seventh example embodiments is achieved. Further, according to the information processing apparatus 10 of the present example embodiment, information indicating a local environment of a site where a trouble happens is output. As a result, a worker and the like can quickly recognize a local environment of the site.

Ninth Example Embodiment

In the present example embodiment, in a case where a plurality of persons are detected from an image, an information generation unit 12 determines priority of rescue for the plurality of detected persons, based on information relevant to a local environment of a site generated in the eighth example embodiment. The information generation unit 12 determines the priority in such a way that a person in more dangerous position has higher priority.

For example, the information generation unit 12 determines the priority of rescue for each of the plurality of detected persons, based on a priority determination rule being preliminarily registered in an information processing apparatus 10.

Although a content of the priority determination rule is not particularly limited, for example, a condition for giving a point, such as "(smoke density) equal to or more than $D_2$: eight points, less than $D_2$ and equal to or more than $D_3$: six points, . . . ", "(temperature) equal to or more than $T_2$: six points, less than $T_2$ and equal to or less than $T_3$: four points, . . . ", and "(equipment state) a piece of failed equipment exists within a first distance: three points, no failed equipment exists within the first distance: one point, . . . ", may be set. In this case, the information generation unit 12 detects, for each of the detected persons, a condition satisfied by a position where the person is present (a position of the person indicated by the above-described positional information), and computes a total point by adding up points of the detected condition. Then, the information generation unit 12 determines the priority in order of the total points. Note that, the example herein is merely one example, and is not limited thereto. For example, the priority determination rule may further include the contents described in the sixth example embodiment.

An output unit 13 outputs the priority for each of the plurality of detected persons. For example, the output unit 13 may output information indicating the priority in association with each of the plurality of persons detected in an image, by using an AR technique. A worker can quickly recognize a situation at the site and the priority of rescue for the plurality of persons, based on the information.

Other configurations of the information processing apparatus 10 according to the present example embodiment are similar to those of the first to eighth example embodiments.

According to the information processing apparatus 10 of the present example embodiment, an advantageous effect similar to that of the first to eighth example embodiments is achieved. Further, according to the information processing apparatus 10 of the present example embodiment, a person present at a site where a trouble happens is detected by an image analysis, and priority of rescue determined based on an environment of a position where the detected person is present is output. As a result, work of recognizing a situation at the site can be assisted.

Tenth Example Embodiment

In the present example embodiment, an information generation unit 12 computes an evacuation route, based on information relevant to a local environment of a site generated in the eighth example embodiment.

Figure 8:
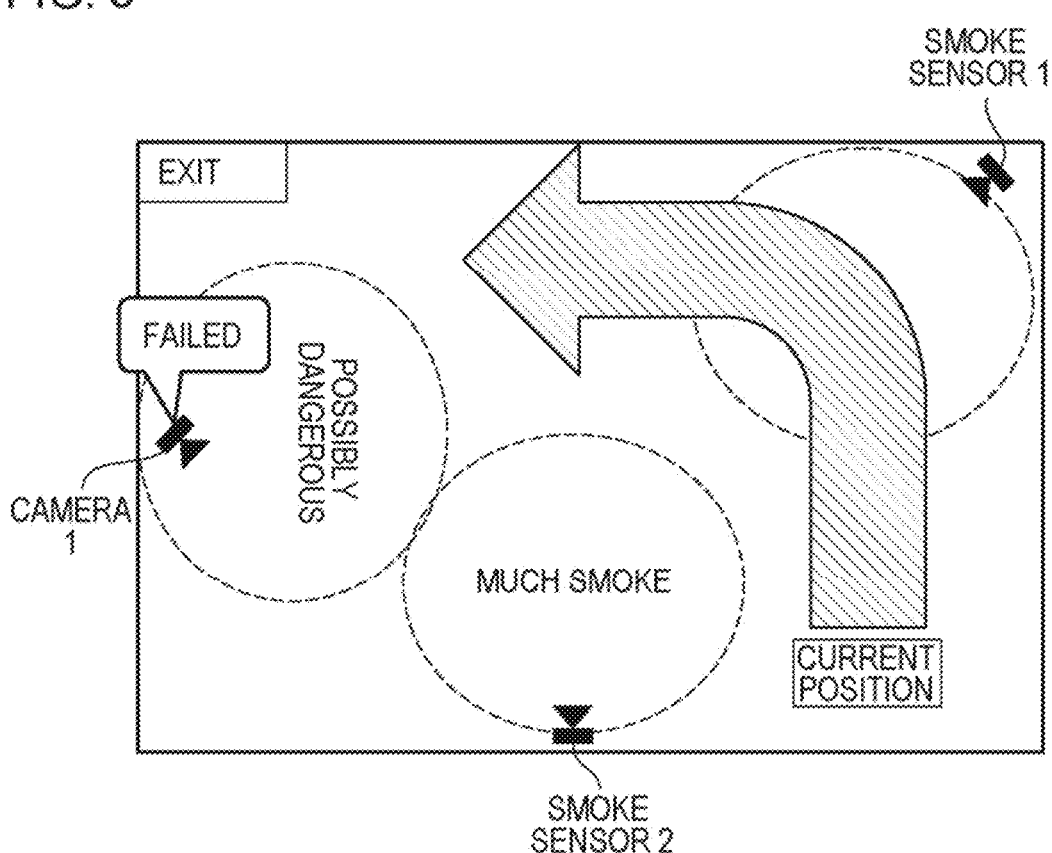
FIG. 8 is a diagram schematically illustrating another example of the information output from the information processing apparatus.

One example is illustrated in FIG. 8. In the illustrated example, a route from a current position of a worker to an exit is computed. The computed route is illustrated as an arrow. There are various methods of computing the route. One example is described below.

First, the information generation unit 12 searches, based on a floor map of a site and a current position of a worker, for a plurality of routes from the current position to a destination such as an exit. After that, the information generation unit 12 computes a danger score for each of the plurality of searched routes.

For example, the information generation unit 12 computes a danger score for each of the routes, based on a danger score determination rule being preliminarily registered in an information processing apparatus 10.

Although a content of the danger score determination rule is not particularly limited, for example, a condition for giving a point, such as "(smoke density) equal to or more than $D_2$: eight points, less than $D_2$ and equal to or more than $D_3$: six points, . . . ", "(temperature) equal to or more than $T_2$: six points, less than $T_2$ and equal to or more than $T_3$: four points, . . . ", and "(equipment state) a piece of failed equipment exists within a first distance: three points, no failed equipment exists within the first distance: one point, . . . ", may be set. In this case, information generation unit 12 detects, for each of the detected routes, a condition satisfied by each area passed by the route, and computes a danger score by adding up points of the detected condition. Then, the information generation unit 12 determines a route with a lowest danger score as an evacuation route.

Then an output unit 13 outputs the computed evacuation route. For example, the output unit 13 may output information indicating the evacuation route on the floor map of the site, such as illustrated in FIG. 8.

Other configurations of the information processing apparatus 10 according to the present example embodiment are similar to those of the first to ninth example embodiments.

According to the information processing apparatus 10 of the present example embodiment, an advantageous effect similar to that of the first to ninth example embodiments is achieved. Further, according to the information processing apparatus 10 of the present example embodiment, a safer evacuation route is computed based on information relevant to a local environment of a site, and the computed evacuation route is output. As a result, work of recognizing a situation at the site can be assisted.

Eleventh Example Embodiment

In the present example embodiment, an information generation unit 12 generates danger level information indicating a danger level for each area within a site, based on information relevant to a local environment of the site generated in the eighth example embodiment.

For example, the information generation unit 12 computes the danger level for each area of the site, based on a danger level computation rule being preliminarily registered in the information processing apparatus 10.

Although a content of the danger level computation rule is not particularly limited, for example, a condition for giving a point, such as "(smoke density) equal to or more than $D_2$: eight points, less than $D_2$ and equal to or more than $D_3$: six points, . . . ", "(temperature) equal to or more than $T_2$: six points, less than $T_2$ and equal to or more than $T_3$: four points, . . . ", and "(equipment state) a piece of failed equipment exists within a first distance: three points, no failed equipment exists within the first distance: one point, . . . ", may be set. In this case, the information generation unit 12 detects a condition satisfied for each area, and computes a danger level by adding up points of the detected conditions Note that, the information generation unit 12 may set a total of the points as the danger level, or may convert the total of the points into another index, based on a criterion such as "the total point is equal to or more than $P_1$: high danger level", "the total point is less than $P_1$ and equal to or more than $P_2$: middle danger level", and "the total point is less than $P_2$: low danger level", and may set the index after conversion as the danger level.

Figure 9:
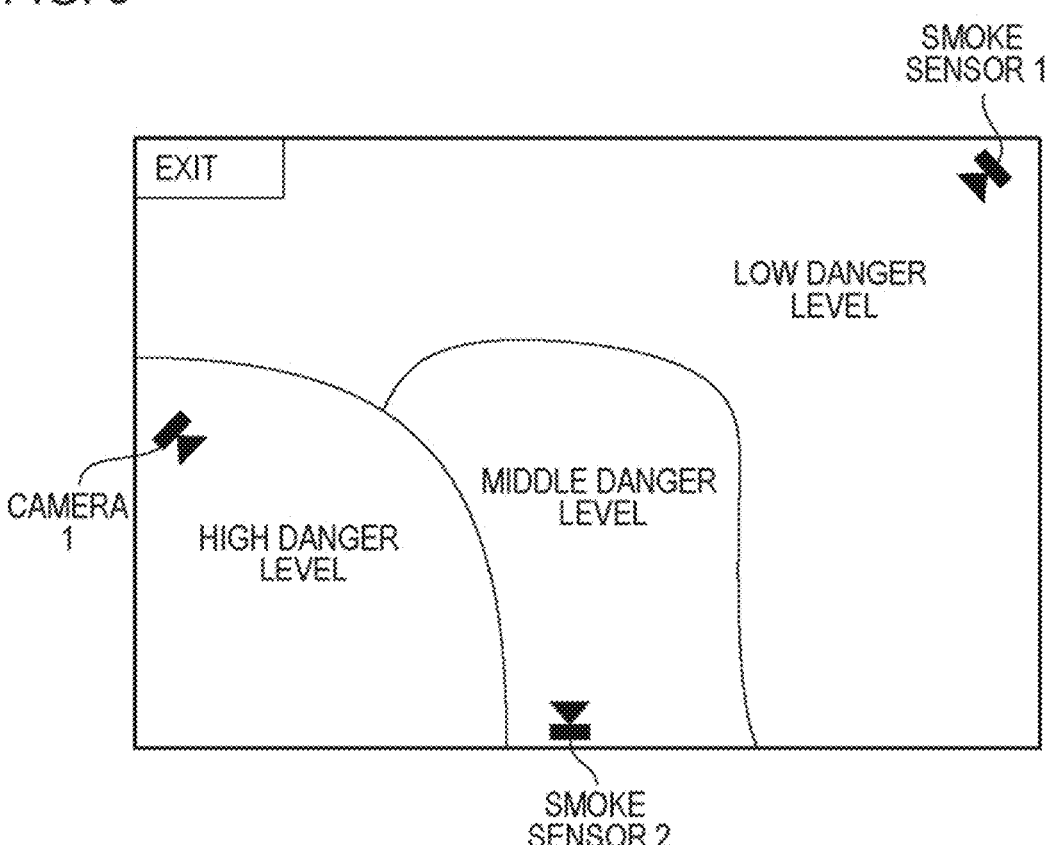
FIG. 9 is a diagram schematically illustrating another example of the information output from the information processing apparatus.

Then, an output unit 13 outputs the computed danger level for each area. For example, the output unit 13 may output information indicating the danger level for each area on a floor map of the site, such as illustrated in FIG. 9.

Other configurations of the information processing apparatus 10 according to the present example embodiment are similar to those of the first to first to tenth example embodiments.

According to the information processing apparatus 10 of the present example embodiment, an advantageous effect similar to that of the first to tenth example embodiments is achieved. Further, according to the information processing apparatus 10 of the present example embodiment, a danger level is computed for each area of a site, based on information relevant to a local environment of the site, and the computed danger level is output. As a result, work of recognizing a situation at the site can be assisted.

Twelfth Example Embodiment

In the present example embodiment, an information generation unit 12 determines a worker who rescues a detected person, based on positional information of the detected person described in the above-described example embodiments and positional information of each worker. Then, an output unit 13 outputs information indicating the worker who rescues the detected person.

For example, the information generation unit 12 determines a worker who is nearest to a detected person, as a worker who rescues the person. Further, in a case where determining the worker who is nearest to the detected person, as a worker who rescues another person, the information generation unit 12 may determine a worker who is second nearest to the detected person, as the worker who rescues the detected person.

The output unit 13 may output, to a worker terminal 20 of the worker who is determined to rescue the detected person, information relevant to the detected person, for example, information relevant to positional information, a pose, a movement, an age group, gender, a peripheral environment, and the like. A method of generating those pieces of information is as described in the above-described example embodiments.

Other configurations of an information processing apparatus 10 of the present example embodiment is similar to those of the first to eleventh example embodiments.

According to the information processing apparatus 10 of the present example embodiment, an advantageous effect similar to that of the first to eleventh example embodiments is achieved. Further, according to the information processing apparatus 10 of the present example embodiment, a worker who is best suited to rescue each person detected by an image analysis can be determined based on positional information of the detected person and positional information of the worker, and the determined worker can be output. As a result, work of recognizing a situation at a site can be assisted.

Thirteenth Example Embodiment

Figure 10:
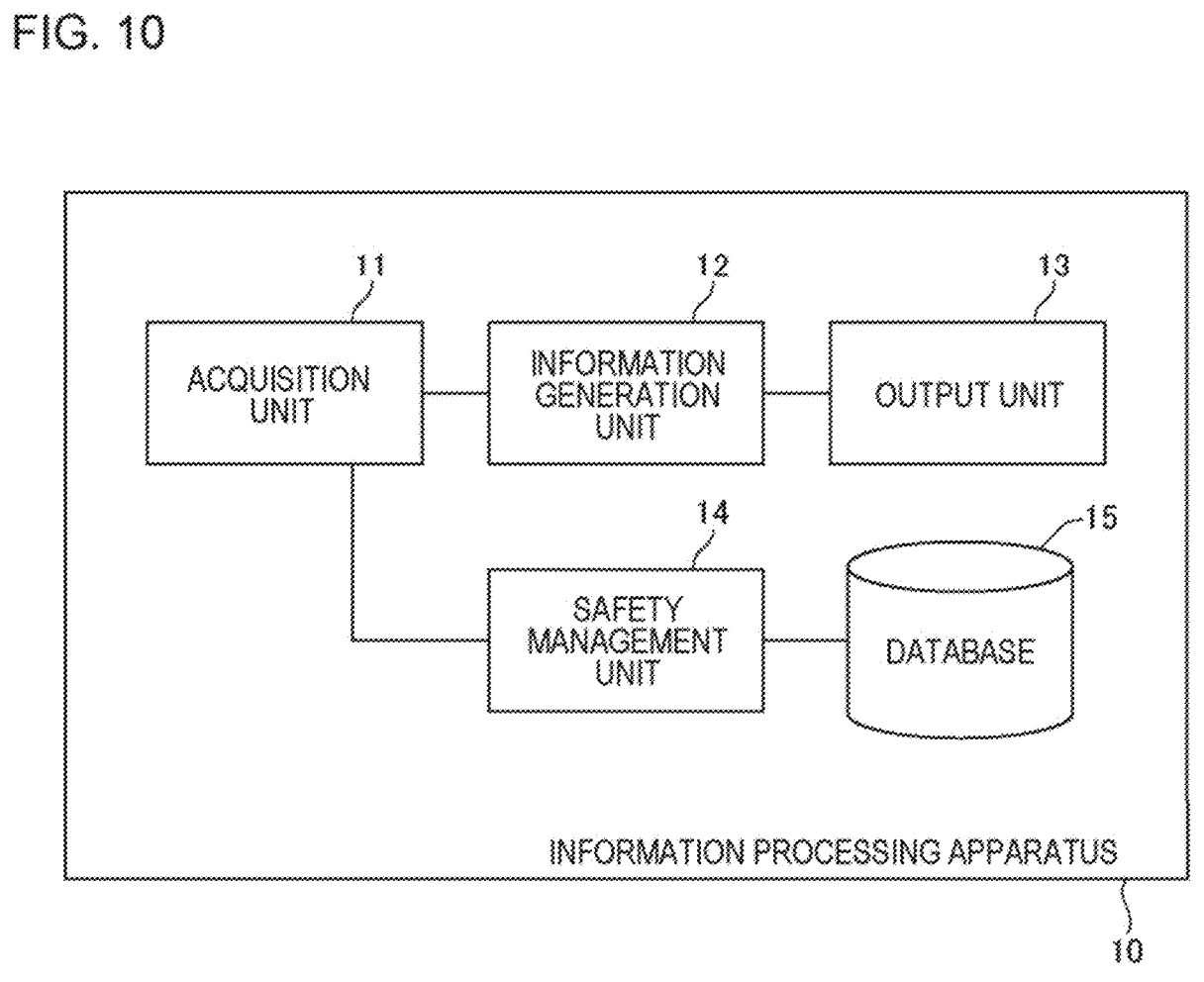

One example of a functional block diagram of an information processing apparatus 10 according to the present example embodiment is illustrated in FIG. 10. As illustrated, the information processing apparatus 10 includes an acquisition unit 11, an information generation unit 12, an output unit 13, safety management unit 14, and a database 15.

A list of persons present at a site is registered in the database 15. An appearance feature value (a face feature value, a feature value of personal belongings, and the like) of each of the persons is registered in the list. The list is generated before a trouble happens at the site. For example, an entry/exit management system that manages an entering person and leaving person at an entrance/exit of the site generates the list by capturing an image of appearance of an entering person, and the like.

The safety management unit 14 collates an appearance feature value of a person detected from an image captured at the site with a feature value of a person registered in the database 15. Then, safety information registered in the database 15 is updated based on a result of the collation. One example of the safety information registered in the database 15 is schematically illustrated in FIG. 11. In the illustrated safety information, a serial number given to each of a plurality of persons, face information of each of the persons, and a safety confirmation result are associated with one another. The safety confirmation result for a person who is detected from an image captured at the site is "completed", and the safety confirmation result for a person who is not detected from the image captured at the site is "unconfirmed".

Note that, although it is not illustrated, in association with a person whose safety confirmation result is "completed", a pose or a movement of the person at a time of detection, a peripheral environment, and the like may be registered.

Other configurations of the information processing apparatus 10 according to the present example embodiment are similar to those of the first to twelfth example embodiments.

According to the information processing apparatus 10 of the present example embodiment, an advantageous effect similar to that of the first to twelfth example embodiments is achieved. Further, according to the information processing apparatus 10 of the present example embodiment, safety confirmation of a person present at a site can be performed by an image analysis.

Modification Example

In a case in which a worker terminal 20 is a wearable terminal, a direction in which the worker terminal 20 captures an image may be the same as or different from a sight direction of a worker. It is preferable that the image is captured in a direction different from the sight direction of the worker (for example, rearward), because information on a dead angle of the worker can be conveyed to the worker.

Further, in a case in which the worker terminal 20 is a wearable terminal and is an eyeglasses-type wearable terminal (a terminal that displays information on a lens part of eyeglasses) that displays information overlaid on a visual field of a user, a state in which an image captured by a camera is displayed on a lens part and a state in which the image captured by the camera is not displayed on the lens part may be switched according to an instruction by a worker.

Further, a frame rate of a moving image to be transmitted from the worker terminal 20 to an information processing apparatus 10 may be switched. For example, the frame rate may be raised to a relatively high rate while a person is detected in an image, and the frame rate may be lowered to a relatively low rate while no person is detected in the image. Determination as to whether a person is detected from the image may be performed by the worker terminal 20. Alternatively, the information processing apparatus 10 may perform the above-described determination, and transmit a result of the determination to the worker terminal 20.

Further, as described above, an image analysis system 40 includes a plurality of image analysis functions, and a trigger for executing each of the functions may be registered in advance. Further, an information generation unit 12 may input, in response to satisfaction of each trigger, an instruction to execute an image analysis using a function associated with the trigger, to the image analysis system 40. Details of the trigger for executing each function are not particularly limited.

Further, the information processing apparatus 10 may preform safety confirmation of each worker, based on an image acquired from the worker terminal 20. For example, presence or absence of a movement of the worker can be determined based on a change in the image. In a case where there is a change in the image, that is, there is a movement of the worker, the information processing apparatus 10 may determine that the worker is safe, and in a case where there is no change in the image, that is, there is no movement of the worker, the information processing apparatus 10 may determine that the worker is not safe.

While the example embodiments of the present invention have been described with reference to the drawings, the example embodiments are exemplifications of the present invention, and various configurations other than the above-described configuration may also be employed. Configurations of the above-described example embodiments may be combined with each other or some of the configurations may be replaced with other configurations. Further, the configurations of the above-described example embodiments may be added with various modifications to an extent that does not depart from the scope of the present invention. Further, a configuration and processing disclosed in each of the above-described example embodiments and the modification examples may be combined with each other.

Further, in a plurality of flowcharts referred to in the above description, a plurality of steps (pieces of processing) are described in order, but an execution order of the steps executed in each example embodiment is not limited to the described order. In each example embodiment, the illustrated order of the steps may be changed to an extent that contents thereof are not interfered. Further, each of the above-described example embodiments may be combined to an extent that contents thereof do not conflict with each other.

A part or the entirety of the above-described example embodiments may be described as the following supplementary notes, but is not limited thereto.

1. An information processing apparatus including:
　an acquisition unit that acquires an image captured at a site where a trouble happens;
　an information generation unit that detects a person from the image, and also generates information relevant to the detected person, based on the image; and
　an output unit that outputs the information relevant to the detected person.

2. The information processing apparatus according to supplementary note 1, wherein
　the information relevant to the detected person includes positional information of the detected person.

3. The information processing apparatus according to supplementary note 1 or 2, wherein
　the information relevant to the detected person indicates at least one of a number of persons in each of a plurality of poses, a number of persons doing each of a plurality of movements, a number of persons in each age group, and a number of persons of each gender.

4. The information processing apparatus according to any one of supplementary notes 1 to 3, wherein
　the information relevant to the detected person indicates at least one of a number and positional information of persons who satisfy a condition defined by using at least one of a pose, a movement, an age group, and gender.

5. The information processing apparatus according to any one of supplementary notes 1 to 4, wherein,
　in a case where the detected person is plural, the information generation unit determines priority of rescue for a plurality of the detected persons, based on a pose, a movement, an age group, and gender, and
　the output unit outputs the priority.

6. The information processing apparatus according to any one of supplementary notes 1 to 5, wherein
　the information generation unit generates information relevant to an environment of the site,
　the output unit outputs the information relevant to the environment of the site, and
　the information relevant to the environment of the site indicates at least one of a current temperature of the site, a trend of temporal change in temperature of the site, a current smoke state of the site, a trend of temporal change in smoke of the site, a current state of a plurality of pieces of equipment installed at the site, and a trend of temporal change in state of a plurality of pieces of equipment installed at the site.

7. The information processing apparatus according to supplementary note 6, wherein
　the information relevant to the environment of the site includes information relevant to a local environment of the site.

8. The information processing apparatus according to supplementary note 7, wherein, in a case where the detected person is plural, the information generation unit determines priority of rescue for a plurality of the detected persons, based on the information relevant to the local environment of the site and positional information of the detected persons, and the output unit outputs the priority.

9. The information processing apparatus according to supplementary note 7 or 8, wherein the information generation unit computes an evacuation route, based on the information relevant to the local environment of the site and a map of the site, and the output unit outputs the evacuation route.

10. The information processing apparatus according to any one of supplementary notes 7 to 9, wherein the information generation unit generates danger level information indicating a danger level of each area in the site, based on the information relevant to the local environment of the site, and the output unit outputs the danger level.

11. The information processing apparatus according to any one of supplementary notes 1 to 10, wherein the information generation unit determines a worker who rescues the detected person, based on positional information of each of a plurality of workers engaged in a rescue operation at the site and positional information of the detected person, and the output unit outputs information indicating the worker who rescues the detected person.

12. The information processing apparatus according to any one of supplementary notes 1 to 11, further including a safety management unit that collates a face image of the detected person with a face image of a person preliminarily registered in a database, and updates safety information of the person registered in the database.

13. The information processing apparatus according to any one of supplementary notes 1 to 12, wherein the acquisition unit acquires the image captured by a worker terminal held by a worker engaged in a rescue operation at the site.

14. An information processing method including, executing by a computer:

an acquisition step of acquiring an image captured at a site where a trouble happens;

an information generation step of detecting a person from the image, and also generating information relevant to the detected person, based on the image; and an output step of outputting the information relevant to the detected person.

15. A program causing a computer to function as:

an acquisition unit that acquires an image captured at a site where a trouble happens;

an information generation unit that detects a person from the image, and also generates information relevant to the detected person, based on the image; and an output unit that outputs the information relevant to the detected person.

REFERENCE SIGNS LIST

10 Information processing apparatus
11 Acquisition unit
12 Information generation unit
13 Output unit
14 Safety management unit
15 Database 20 Worker terminal
30 Center terminal
40 Image analysis system
1A Processor
2A Memory
3A Input/output I/F
4A Peripheral circuit
5A Bus

What is claimed is:

1. An information processing apparatus comprising:

at least one memory configured to store one or more instructions; and at least one processor configured to execute the one or more instructions to:

acquire an image captured at a site where a trouble happens;

detect a person from the image, and also generate information relevant to the detected person, based on the image; and output the information relevant to the detected person, wherein the at least one processor is further configured to execute the one or more instructions to:

detect a rescue target person and an object in a periphery of the rescue target person from the image;

generate information relevant to the rescue target person including a relative relationship between a worker and the object based on the image and a floor map of the site, the information indicating a position of the object by a direction and a distance based on a current position of the worker; and output the information relevant to the rescue target person.

2. The information processing apparatus according to claim 1, wherein the information relevant to the detected person includes positional information of the detected person.

3. The information processing apparatus according to claim 1, wherein the information relevant to the detected person indicates at least one of a number of persons in each of a plurality of poses, a number of persons doing each of a plurality of movements, a number of persons in each age group, and a number of persons of each gender.

4. The information processing apparatus according to claim 1, wherein the information relevant to the detected person indicates at least one of a number and positional information of persons who satisfy a condition defined by using at least one of a pose, a movement, an age group, and gender.

5. The information processing apparatus according to claim 1, wherein the at least one processor is further configured to execute the one or more instructions to;

in a case where the detected person is plural, determine priority of rescue for a plurality of the detected persons, based on a pose, a movement, an age group, and gender, and output the priority.

6. The information processing apparatus according to claim 1, wherein the at least one processor is further configured to execute the one or more instructions to:

generate information relevant to an environment of the site; and output the information relevant to the environment of the site, wherein the information relevant to the environment of the site indicates at least one of a current temperature of the site, a trend of temporal change in temperature of the site, a current smoke state of the site, a trend of temporal change in smoke of the site, a current state of a plurality of pieces of equipment installed at the site, and a trend of temporal change in state of a plurality of pieces of equipment installed at the site.

7. The information processing apparatus according to claim 6, wherein
the information relevant to the environment of the site includes information relevant to a local environment of the site.

8. The information processing apparatus according to claim 7 wherein the at least one processor is further configured to execute the one or more instructions to:
in a case where the detected person is plural, determine priority of rescue for a plurality of the detected persons, based on the information relevant to the local environment of the site and positional information of the detected persons; and
output the priority.

9. The information processing apparatus according to claim 7, wherein the at least one processor is further configured to execute the one or more instructions to:
compute an evacuation route, based on the information relevant to the local environment of the site and a map of the site; and
output the evacuation route.

10. The information processing apparatus according to claim 7, wherein the at least one processor is further configured to execute the one or more instructions to:
generate danger level information indicating a danger level of each area in the site, based on the information relevant to the local environment of the site; and
output the danger level.

11. The information processing apparatus according to claim 1, wherein the at least one processor is further configured to execute the one or more instructions to:
determine a worker who rescues the detected person, based on positional information of each of a plurality of workers engaged in a rescue operation at the site and positional information of the detected person; and
output information indicating the worker who rescues the detected person.

12. The information processing apparatus according to claim 1, wherein the at least one processor is further configured to execute the one or more instructions to:
collate a face image of the detected person with a face image of a person preliminarily registered in a database, and update safety information of the person registered in the database.

13. The information processing apparatus according to claim 1, wherein
the at least one processor is further configured to execute the one or more instructions to acquire the image captured by a worker terminal held by a worker engaged in a rescue operation at the site.

14. An information processing method comprising, executing by a computer:
acquiring an image captured at a site where a trouble happens;

detecting a person from the image, and also generating information relevant to the detected person, based on the image; and
outputting the information relevant to the detected person;
detecting a rescue target person and an object in a periphery of the rescue target person from the image,
generating information relevant to the rescue target person including a relative relationship between a worker and the object based on the image and a floor map of the site, the information indicating a position of the object by a direction and a distance based on a current position of the worker, and
outputting the information relevant to the rescue target person.

15. The information processing method according to claim 14, wherein
the information relevant to the detected person includes positional information of the detected person.

16. The information processing method according to claim 14, wherein
the information relevant to the detected person indicates at least one of a number of persons in each of a plurality of poses, a number of persons doing each of a plurality of movements, a number of persons in each age group, and a number of persons of each gender.

17. The information processing method according to claim 14, wherein
the information relevant to the detected person indicates at least one of a number and positional information of persons who satisfy a condition defined by using at least one of a pose, a movement, an age group, and gender.

18. A non-transitory storage medium storing a program causing a computer to:
acquire an image captured at a site where a trouble happens;
detect a person from the image, and also generate information relevant to the detected person, based on the image;
output the information relevant to the detected person;
detect a rescue target person and an object in a periphery of the rescue target person from the image;
generate information relevant to the rescue target person including a relative relationship between a worker and the object based on the image and a floor map of the site, the information indicating a position of the object by a direction and a distance based on a current position of the worker; and
output the information relevant to the rescue target person.

19. The non-transitory storage medium according to claim 18, wherein
the information relevant to the detected person includes positional information of the detected person.

20. The non-transitory storage medium according to claim 18, wherein
the information relevant to the detected person indicates at least one of a number of persons in each of a plurality of poses, a number of persons doing each of a plurality of movements, a number of persons in each age group, and a number of persons of each gender.

* * * * *